United States Patent
Ghuman (10) Patent No.: US 9,906,314 B2
(45) Date of Patent: Feb. 27, 2018

(54) HYBRID FIBER MILLIMETER WAVE WIRELESS SYSTEM FOR MULTI-GIGABIT CONNECTIVITY

(71) Applicant: Harjinder Ghuman, Atlanta, GA (US)

(72) Inventor: Harjinder Ghuman, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 15/064,153

(22) Filed: Mar. 8, 2016

(65) Prior Publication Data

US 2016/0269127 A1  Sep. 15, 2016

Related U.S. Application Data

(60) Provisional application No. 62/130,520, filed on Mar. 9, 2015.

(51) Int. Cl.
  *H04B 10/90* (2013.01)
  *H04J 14/02* (2006.01)
  *H04B 10/2575* (2013.01)

(52) U.S. Cl.
  CPC ....... *H04B 10/90* (2013.01); *H04B 10/25752* (2013.01); *H04J 14/02* (2013.01)

(58) Field of Classification Search
  CPC ................ H04B 10/2575; H04B 10/90; H04B 10/25752; H04J 14/02
  See application file for complete search history.

(56) References Cited

U.S. PATENT DOCUMENTS

| | | | |
|---|---|---|---|
| 7,221,904 B1 * | 5/2007 | Gavrilovich | H04B 7/1555 455/11.1 |
| 9,197,471 B1 * | 11/2015 | Zanoni | H04L 27/223 |
| 2010/0232785 A1 * | 9/2010 | Gazier | H04B 10/2575 398/8 |
| 2013/0322884 A1 * | 12/2013 | Schmidt | H04B 10/1129 398/115 |

\* cited by examiner

*Primary Examiner* — Leslie Pascal
(74) *Attorney, Agent, or Firm* — Eversheds Sutherland (US) LLP (57) ABSTRACT

Embodiments of the present disclosure include methods, devices and systems for a millimeter wave (MMW) last mile delivery system. A multi-wavelength fiber link may be provided from a collector terminal node area to a central office. One or more streams of data may be wirelessly transmitted from the collector terminal node area to user equipment. Based at least in part on the one or more streams of data, multi-gigabit Ethernet may then be provided to the user equipment utilizing an analog or digital modulation scheme over one or more channels.

15 Claims, 6 Drawing Sheets

250 MHz, 256 QAM
2 Ft Dish   Speed 1.5 Gbps

| Area | Rain Rate | 99.995 Dist (km) | 99.995 Dist (km) |
|---|---|---|---|
| | | 26.3 mins | 5.3 mins |
| Phoenix, AZ | 33.15 | 1.45 | 1 |
| Salt Lake, UT | 21.17 | 1.8 | 1.25 |
| Omaha, NE | 39.69 | 1.35 | 0.9 |

HYBRID FIBER MILLIMETER WAVE WIRELESS SYSTEM FOR MULTI-GIGABIT CONNECTIVITY

CROSS-REFERENCE TO RELATED APPLICATIONS

This application claims priority to and benefit of U.S. Patent Application Ser. No. 62/130,520 filed on Mar. 9, 2015, and entitled "Hybrid Fiber Millimeter Wave Wireless System for Multi-Gigabit Connectivity." The disclosure of the aforementioned application is entirely incorporated herein by reference.

TECHNICAL FIELD

Embodiments described herein generally relate to telecommunications and more particularly to last mile networks for multi-gigabit internet connectivity.

BACKGROUND

Current last mile access networks for video and broadband Internet connectivity consist of FTTH (fiber to the home) or hybrid networks such as HFC (Hybrid Fiber Coax) deployed widely by Cable Multiple System Operators (MSOs) or VDSL (Very High Speed Digital Subscriber Line) deployed by telecom service providers. HFC is utilized in hybrid fiber/Coax networks while VDSL utilizes copper twisted pair in the last mile to connect to the telecom carrier's central office's main fiber network backbone. All of these networks require cable or fiber connections to the home. The last mile cable connection with ground-bound fibers or cable requires the underground trenching of streets and sidewalks to establish a physical connection, making it very expensive and a major hurdle in providing multi-gigabit Internet connectivity.

DETAILED DESCRIPTION

Embodiments of the present disclosure include methods, devices and systems for a millimeter wave (MMW) last mile delivery system. A multi-wavelength fiber link may be provided from a collector terminal node area to a central office. One or more streams of data may be wirelessly transmitted from the collector terminal node area to user equipment. Based at least in part on the one or more streams of data, multi-gigabit Ethernet may then be provided to the user equipment utilizing an analog or digital modulation scheme over one or more channels.

According to one or more example embodiments, a hybrid wireless network (HFW) may be utilized where millimeter waves may be utilized for the 'last mile' network obviating the need for an actual ground cable or fiber connection. By beaming or transmitting Internet services directly into homes, a last mile wireless network may offer a potentially quicker and cheaper way to deliver high-speed Internet services. According to one or more example embodiments, millimeter waves may serve as the wireless medium since they may transmit data over short distances at speeds of several gigabits per second, essentially serving as a wireless extension of fiber. Thus, the HFW network may provide a cost effective system with a scalable multi-gigabit capacity network ideal for many geographical areas.

Another advantage of the HFW concept is the potentially large savings in power requirements since a power hungry Radio Frequency (RF) coax network (as utilized in cable television (CATV) HFC networks) may be eliminated, resulting in lower operating expenses and creating a greener, environmentally-friendly, network.

Figure 1:
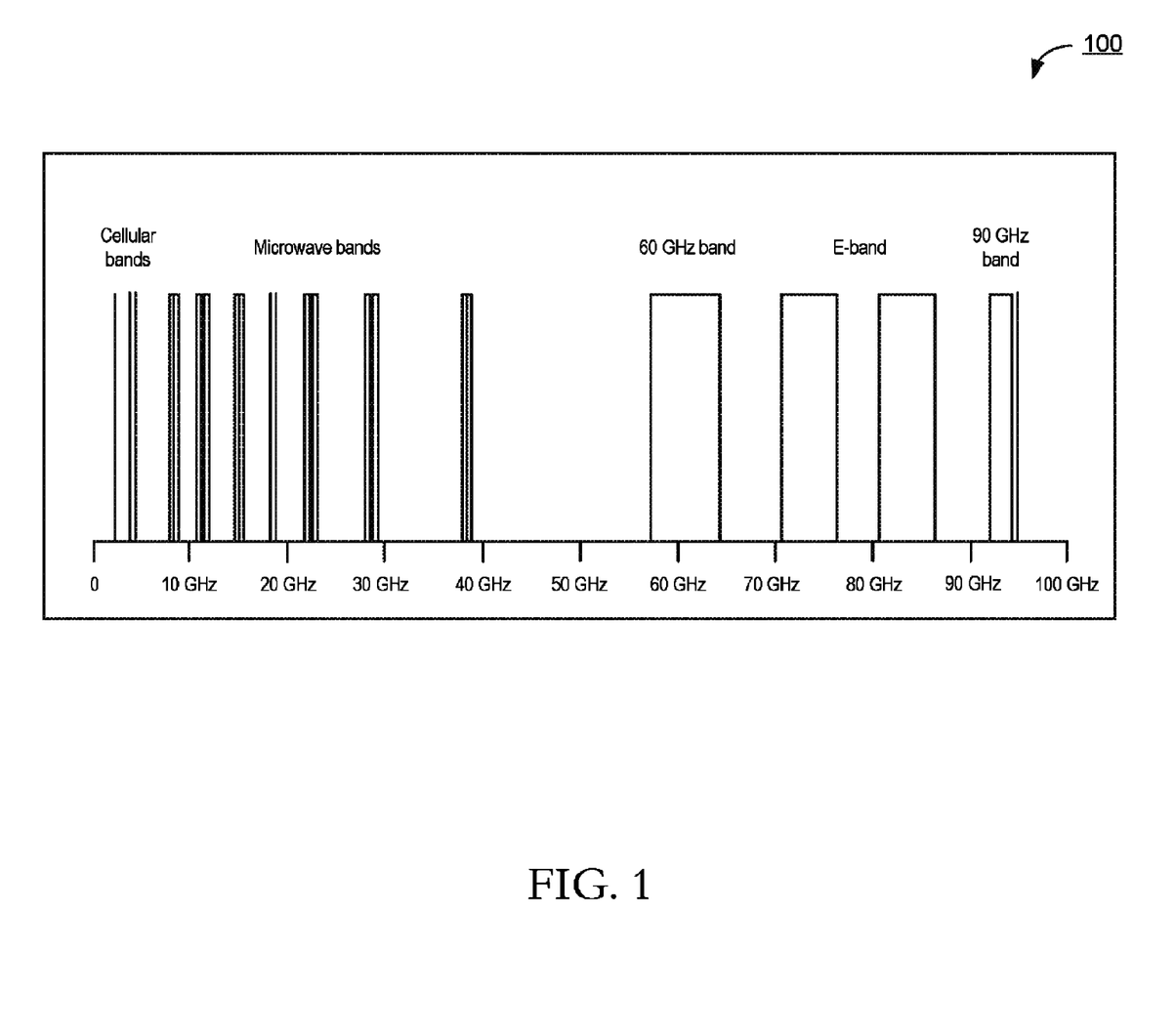
FIG. 1 illustrates millimeter wave frequency allocation, according to at least one embodiment.

The spectrum between 30 GHz and 300 GHz is referred to as the millimeter wave (MMW) band because the wavelengths for these frequencies are about one to ten millimeters. Turning now to the figures, FIG. 1 illustrates MMW frequency allocation 100 across different bands. Of particular interest for one or more example embodiments is the E-Band (70 to 90 GHz). Unlike frequencies found in the lower part of the electromagnetic spectrum, the E-Band offers large, uninterrupted bandwidth to enable wireless data transmission at speeds and capacities on par with the best fiber optic communication systems. Practical data rates in the E-Band band may meet and exceed 40 Gbps. In addition transmission speeds via wireless may prove faster than cable because of less latency.

Figure 2:
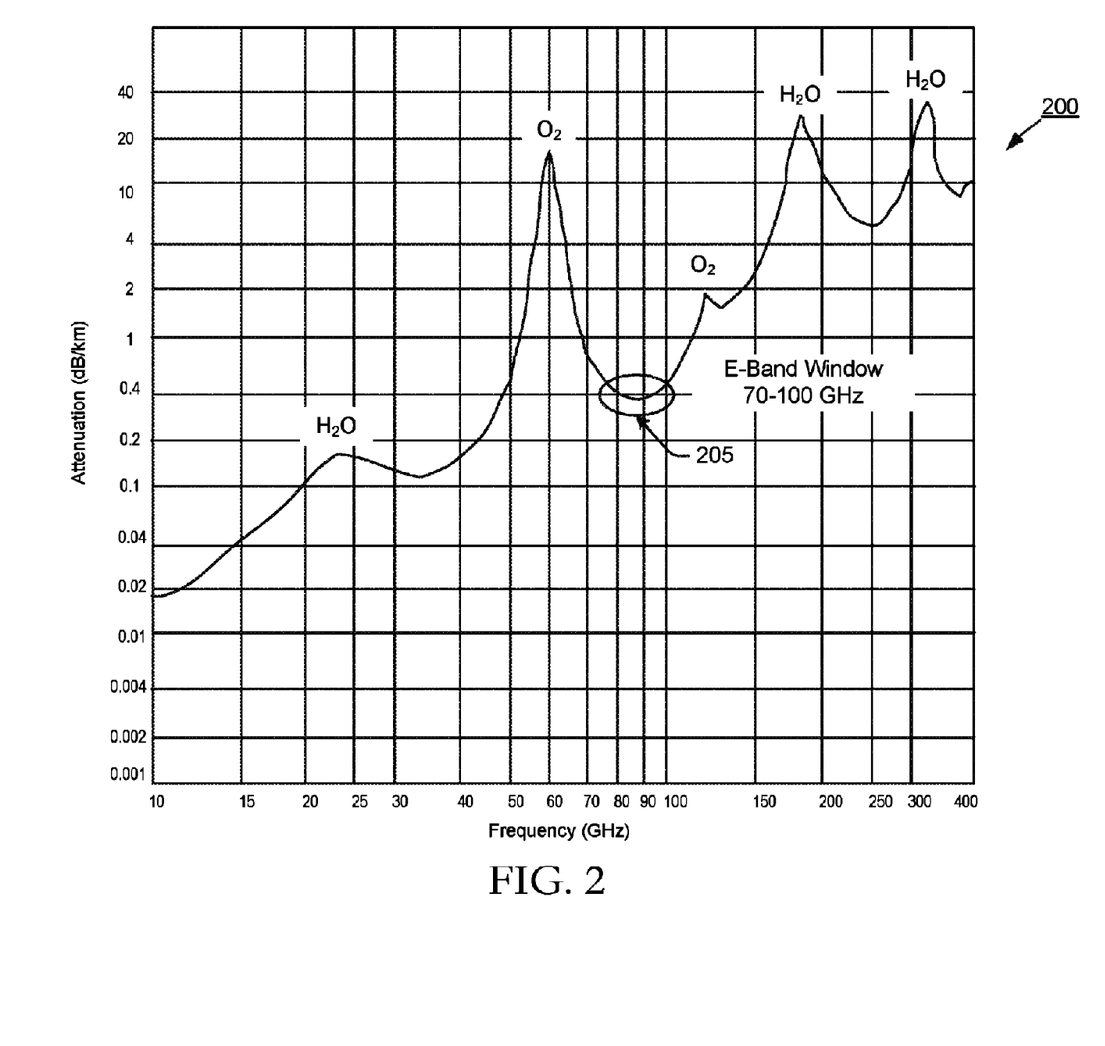
FIG. 2 is a chart showing the atmospheric absorption in the millimeter region of the electromagnetic spectrum, according to at least one embodiment.

According to one or more example embodiments, the V Band (54 to 64 GHz), comprising a 7 GHz spectrum, may be used for the 'last mile' wireless section. This band is unlicensed and may be used for point to multi-point applications. In this embodiment, the typical range for a multi-gigabit link may be less than 1 kilometer due to the oxygen absorption at this band, which is about 15 dB/kilometer at sea level, whereas atmospheric absorption in the 70/80 GHz band varies between 0.4 and 0.7 dB/kilometer. The graph 200 shown in FIG. 2, illustrates atmospheric absorption in the MMW band as indicated, for example, in the graph by the encircled portion 205.

According to one or more example embodiments, the E band 70/80 GHz may be used in a point to multi point application for distances up to 3 kilometers. The Federal Communications Commission (FCC) has opened 13 GHz of spectrum in the E-band from 71 . . . 76 GHz, 81 . . . 86 GHz and 92 . . . 95 GHz for commercial use and high-density fixed (point to point) wireless services in the United States. With a total of 5 GHz of bandwidth available both at 70 GHz and 80 GHz, and 3 GHz at 90 GHz, multi-gigabit Ethernet links may be realized over several miles, according to one or more example embodiments.

Figure 3:
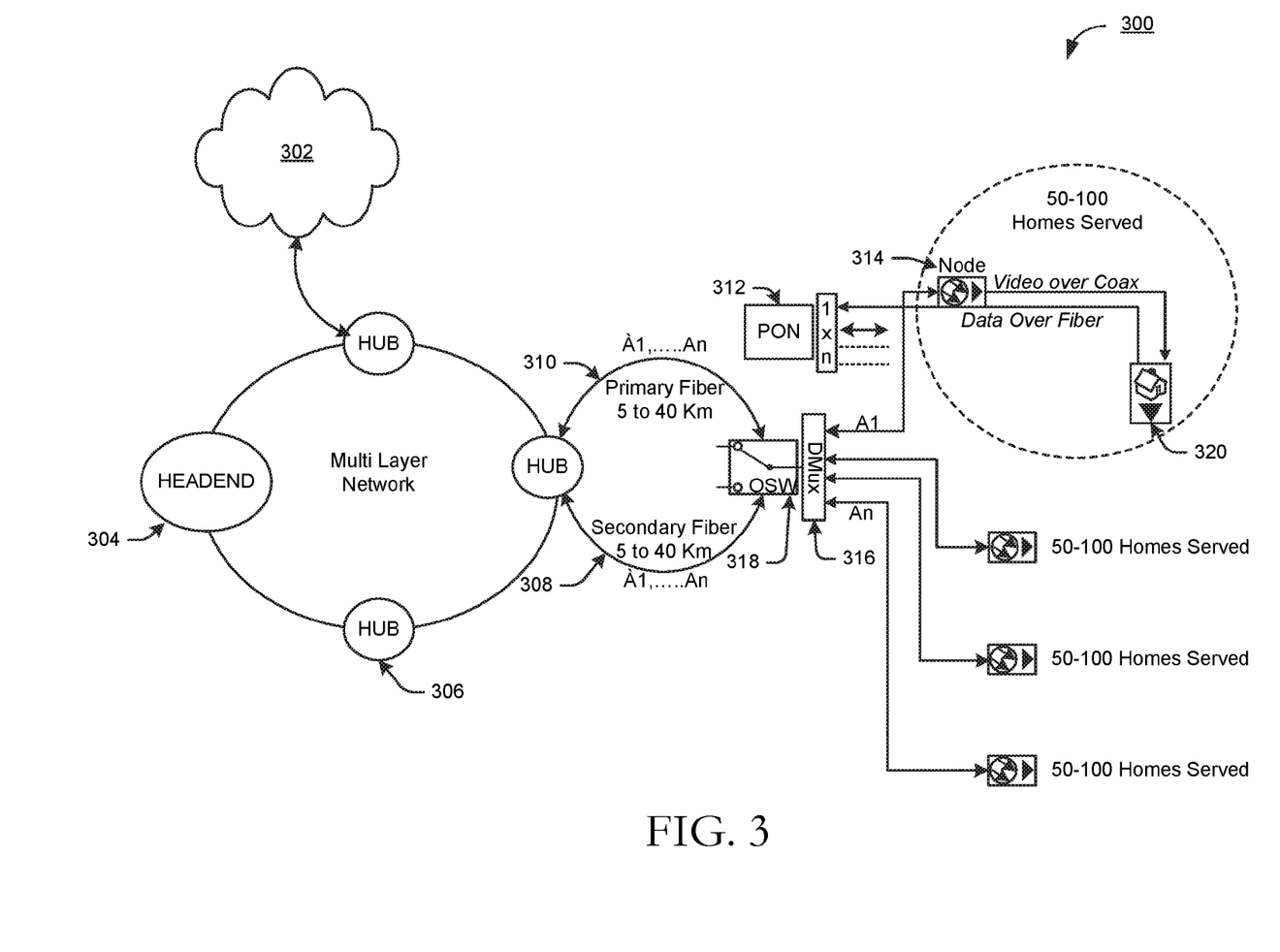
FIG. 3 is a system diagram of an example embodiment of HFC network with a Passive Optical Network (PON) overlay, according to at least one embodiment.

Turning now to FIG. 3, a hybrid fiber-coaxial (HFC) network 300 is illustrated that may combine optical fiber 310 and coaxial cable 308. While HFC networks were originally designed for one-way broadcast video delivery, these networks have been considerably enhanced over the years to provide bidirectional communications and broadband data. A fiber optic network may extend from a cable operators' master or regional headend system 304 out to a neighborhood's optical node (receiver) 314 which may serve 25 to 2000 homes or user end systems 320 over an RF coaxial network. The optical node 314 may convert a downstream optically modulated signal from the headend system 304 and or a hub 306 to an electrical RF signal going to the homes. The HFC network 300 may also include one or more demultiplexers (Dmux) 316 and one or more optical switches 318. In accordance with various embodiments, the Dmux 316 may comprise a device that takes a single input signal and selects one of many data-output-lines, each of which is connected to the single input. A multiplexer (not shown) may be utilized with a complementary demultiplexer on the receiving end. An electronic multiplexer may be considered as a multiple-input, single-output switch, and a demultiplexer as a single-input, multiple-output switch in various embodiments. The optical switch 318 may comprise a switch that enables signals in optical fibers or integrated optical circuits (IOCs) to be selectively switched from one circuit to another.

It should be understood that typical downstream frequencies may be between 50 MHz and 1000 MHz while upstream frequencies may be between 5-42 MHz in North America and 5-65 MHz in other parts of the world. Currently most cable operators utilize DOCSIS 3.0 (Data over Cable Service Interface Specification), an international telecommunications standard that permits the addition of high-bandwidth data transfer to an existing cable TV (CATV) system, to provide Internet access over their existing hybrid fiber-coaxial (HFC) infrastructure. To increase the capacity of HFC networks, however, cable operators may need to deploy the latest DOCSIS 3.1 standard and continue to reduce fiber optic node sizes with 1550 nanometer multi-wavelength transport (DWDM) or adding more fibers. They will also have to increase the return bandwidth capacity from 5-42 MHz to 5-85 MHz or 5-204 MHz. This may require huge outlays in capital expenditure. DOCSIS 3.1 plans to support capacities of at least 10 Gbit/s downstream and 1 Gbit/s upstream to the fiber node using a 4096 QAM modulation scheme. This bandwidth may need to be shared between tens to several hundred subscribers so even a DOCSIS 3.1 enabled HFC network with a very small node serving area of 50 homes cannot provide multi-gigabit capacity to each individual user. Thus, cable operators may supplement their HFC networks with separate fiber passive optical networks (PON) 312 in order to provide gigabit speeds as depicted in FIG. 3. As known to those skilled in the art, a PON is a telecommunications network that uses point-to-multipoint fiber to the premises in which unpowered optical splitters are used to enable a single optical fiber to serve multiple premises. A PON consists of an optical line terminal (OLT) at the service provider's central office or an intermediate field hub and a number of optical network units (ONUs) near end users. A PON may reduce the amount of fiber and central office equipment required compared with point-to-point architectures. A PON may also be understood to be a form of a fiber-optic access network. In most cases, downstream signals are broadcast to all premises sharing multiple fibers. Encryption may prevent eavesdropping. Upstream signals may be combined using a multiple access protocol, usually time division multiple access (TDMA).

Figure 4:
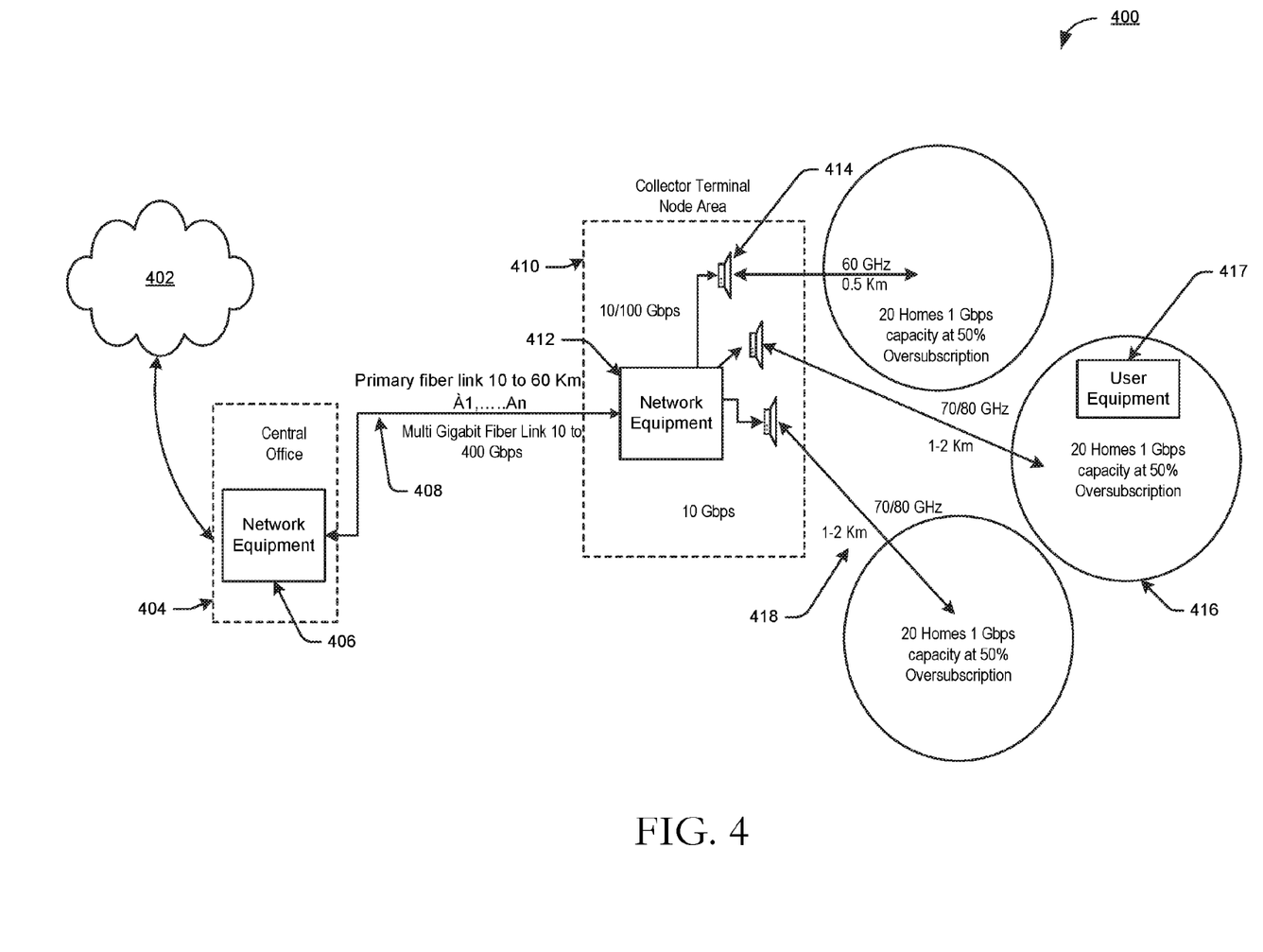
FIG. 4 is a system diagram of an example embodiment of a HFW network, according to at least one embodiment.

FIG. 4 shows a system diagram of an example hybrid fiber wireless (HFW) network 400. According to one example embodiment, a multi-wavelength fiber link 408, which may be scalable from 10 Gbps to 400 Gbps, may be used from a collector terminal node area 410, which may include one or more network equipment 412 and one or more antennas 414, to a central office 404 which may be linked to an IP backbone 402 and which may include one or more network equipment 406. In some embodiments, the multi-wavelength fiber link 408 may extend anywhere from a few kilometers to 60 or more kilometers. At the collector terminal 410 a single 10 Gbps downstream signal may be beamed or transmitted in the V-band at 60 GHz or in the E-band at 70/80 GHz depending on the link distance. In some embodiments, a downstream signal greater than 10 Gbps may be beamed on a bandwidth required at a subscriber end 416 which may include user equipment 417. In some embodiments, the 10 Gbps (or greater) downstream signal may be beamed in a frequency range between 200 GHz and 280 GHz within the MMW band. In accordance with example embodiments, a serving area of twenty homes may allow for 1 Gbps per subscriber at a 50% oversubscription rate 418. In some embodiments, a bidirectional (i.e., symmetrical) 1 Gbps link may be utilized for business and enterprise solutions. In other embodiments, a lower upstream speed may be provided as a lower cost solution for residential service.

It should be understood that the network 400 may utilize the MMW band, which has a large inherent capacity and by eliminating the last mile fiber or cable connection, may facilitate deployment of multi-gigabit IP data and video services. In the MMW band, V-band operation may occur at the unlicensed 60 GHz frequency while E-band operation may occur at 71-76 GHz and 81-86 GHz licensed frequencies. Other MMW frequencies (e.g., frequencies between 200 GHz and 280 GHz) may also be utilized. It should be understood that the E-band frequencies may require licensing and may be only authorized for fixed point-to-point applications. In some embodiments, multi-gigabit speeds may be realized with distances ranging from 100 meters to 5 kilometers depending on frequency, antenna size and modulation utilized. While MMW may be susceptible to a much higher levels of atmospheric attenuation than other frequencies (such as microwave), this attenuation is dependent upon free space, gases, rain, and foliage but is not affected by fog or snow. Moreover, MMW is inherently secure due to the narrow beams at such frequencies.

The systems 300 and 400 shown in and described with respect to FIGS. 3-4 are provided by way of example only. Numerous other operating environments, system architectures, and device configurations are possible. Other architectures may include fewer or greater numbers of components and may incorporate some or all of the functionality described with respect to the components shown in FIGS. 3-4. Accordingly, embodiments of the invention should not be construed as being limited to any particular system architecture, operating environment, or device configuration.

Figure 5:
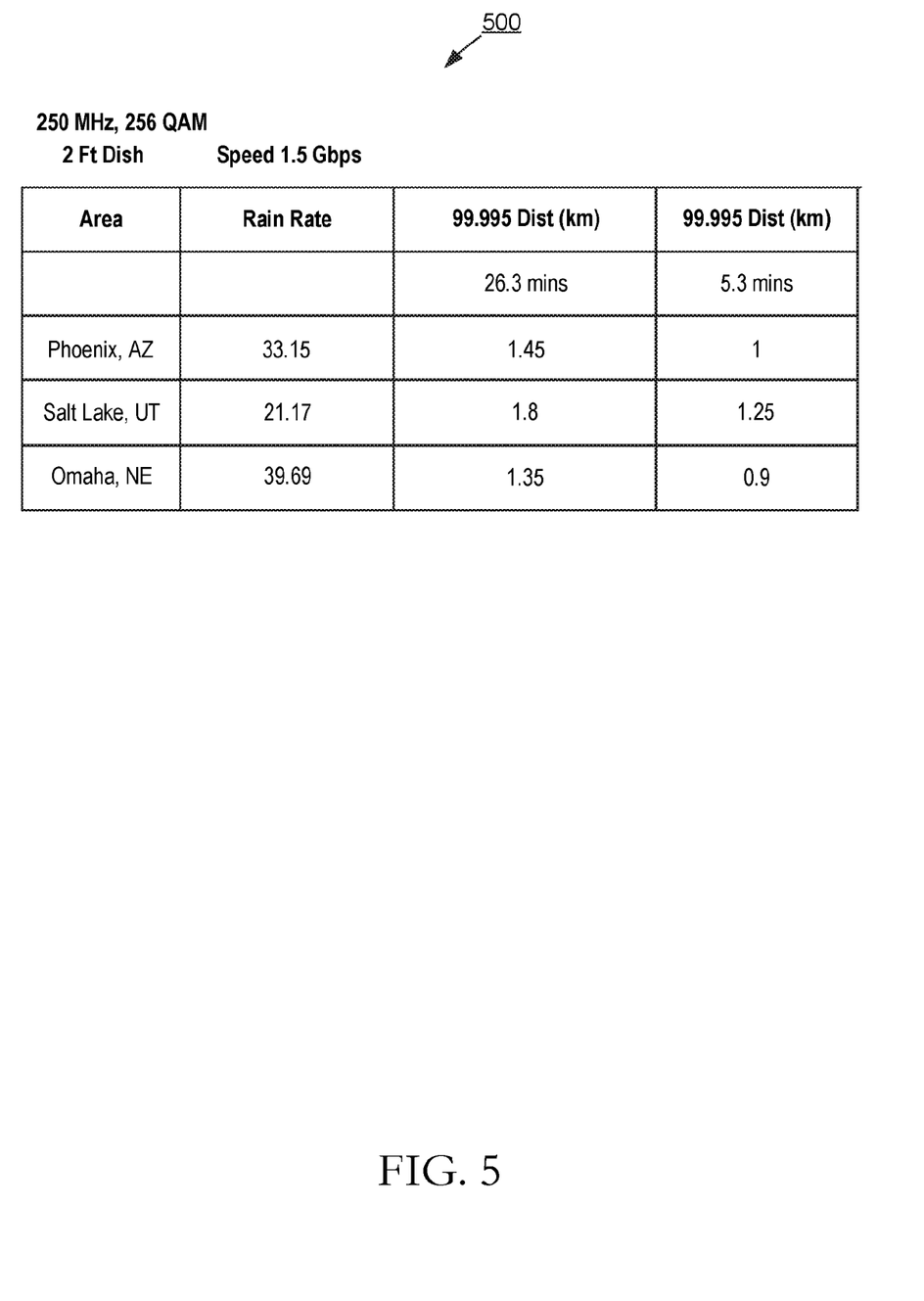
FIG. 5 is a table showing Link distances for 1.5 Gbps speeds for regions with different rain rates, according to at least one embodiment.

Turning now to FIG. 5, table 500 shows that a 1.5 Gbps data link may be achieved over 2 kilometers in the E-band (70/80 GHz) with a link availability of 99.995 (26.3 minutes) utilizing a 256 quadrature amplitude modulation (QAM) scheme over a 250 MHz channel. Data is presented for three geographical areas with different rain rates. Several channels may be aggregated to provide multi-gigabit data capacity, facilitating migration methodology for higher speeds. Since link distances are a function of the modulation scheme deployed, a 32-QAM scheme may be utilized to provide 1 Gbps speeds over longer distances.

Figure 6:
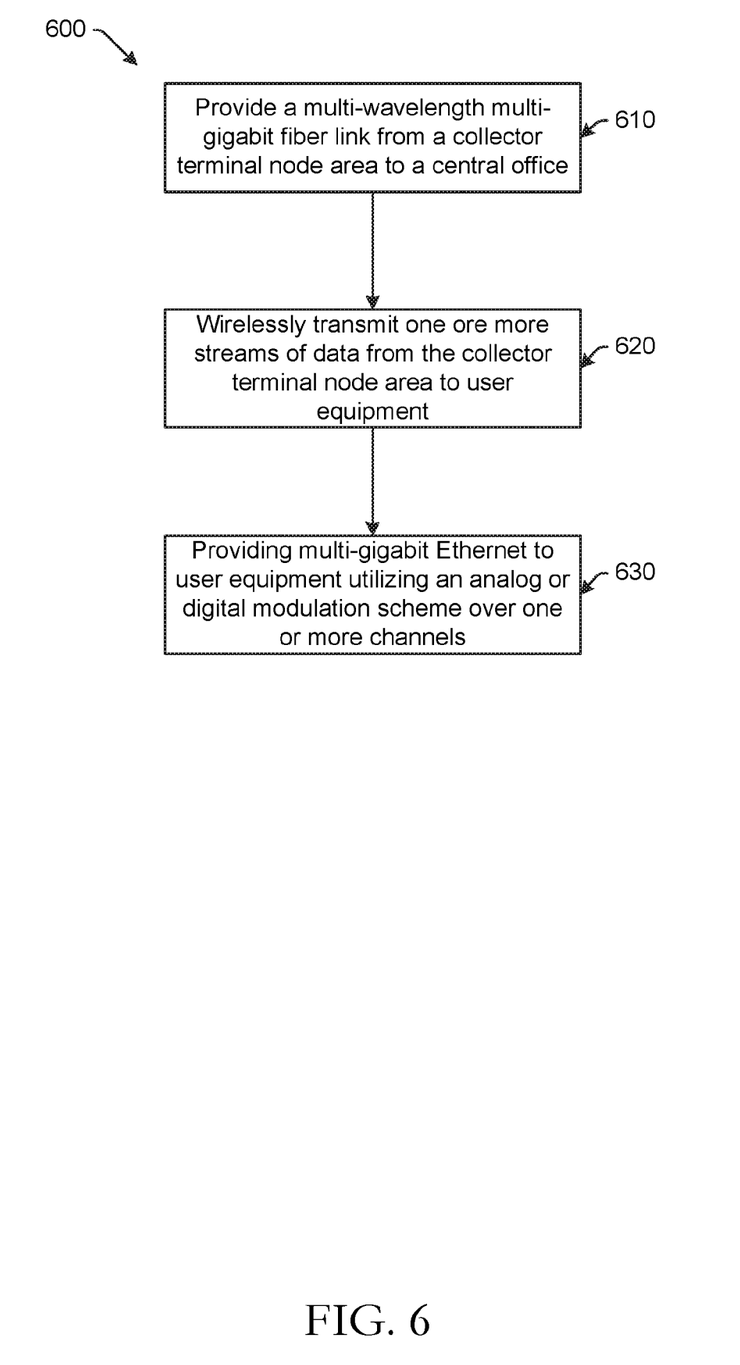
FIG. 6 illustrates operations involved in a method, according to at least one embodiment.

FIG. 6 is a flow diagram of an example method 600 that may be utilized to process content output by a service provider, according to one or more example embodiments. In certain embodiments, the operations of the method 600 may be performed by a suitable HFW architecture or headend system, such as by the system 400 illustrated in FIG. 4. According to one example embodiment, the method 600 may include an operation 610 where a multi-wavelength fiber link is provided from a central office (e.g., the central office 404 of FIG. 4) to a collector terminal node area (e.g., the collector terminal node area 410 of FIG. 4).

The method 600 may continue from operation 610 to operation 620, where the collector terminal node area 410 may wirelessly transmit or beam one or more streams of data to user equipment 417. In some embodiments, the collector terminal node area may utilize one or more high gain directional antennas for wirelessly transmitting the one or more data streams in the MMW band to the user equipment 417. In some embodiments, the data streams may be wirelessly transmitted at one or more V-band frequencies. In other embodiments, the data streams may be wirelessly transmitted at one or more E-band frequencies. For example, the collector terminal node area 410 may transmit or beam a single 1-10 Gbps signal downstream over a last mile in the V-band at 60 GHz or in the E-band at 70/80 GHz depending on the link distance. In still other embodiments, the data streams may be wirelessly transmitted at frequencies between 200 GHz and 280 GHz.

The method 600 may continue from operation 620 to operation 630, where, based at least in part on the one or more streams of data, multi-gigabit Ethernet may be provided to the user equipment 417 utilizing an analog or digital modulation scheme over one or more channels. In some embodiments, several channels may be aggregated to provide multi-gigabit data capacity, thereby facilitating migration methodology for higher speeds In some embodiments, the analog or digital modulation scheme may be a QAM scheme. For example, in some embodiments, a 32, 64, or 256 QAM scheme may be utilized over a 250 MHz channel. According to one example embodiment, MIMO systems (multiple in multiple out) with multichannel beam forming may be utilized (i.e., at both the collector terminal or subscriber end. Following the operation 630, the method 600 ends.

Certain technical effects or solutions may be accomplished by certain embodiments of the disclosure, for example, embodiments disclosed herein may provide data that needs to be processed at the application/service level in the context of what the application/service accomplishes in order to determine how to connect to the discovered device so that the resulting user experience is the best, for example. It should be appreciated that the above examples of technical effects and/or solutions of the present disclosure are merely illustrative and that numerous other technical effects and/or solutions may exist.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that may be accessed by one or more computers or one or more processors to retrieve instructions, code and/or data structures for implementation of the methods described in this disclosure. A computer program product may include a computer-readable medium.

By way of example, and not limitation, such computer-readable storage media may include RAM, ROM, EEPROM, CD-ROM or other optical disk storage, magnetic disk storage, or other magnetic storage devices, Flash memory, or any other medium that may be used to store desired program code in the form of instructions or data structures and that may be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the methods described herein. In addition, in some aspects, the functionality described herein may be provided within dedicated hardware and/or software modules configured for encoding and decoding, or incorporated in a combined codec. Also, the example methods described above could be fully implemented in one or more circuits or logic elements.

The example methods of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed example methods, but do not necessarily require realization by different hardware units. Rather, as described above, various units may be combined in a codec hardware unit or provided by a collection of interoperative hardware units, including one or more processors as described above, in conjunction with suitable software and/or firmware.

One example embodiment is a method including the operations of providing a multi-wavelength fiber link from a collector terminal node area to a central office, wirelessly transmitting one or more streams of data from the collector terminal node area to one or more user equipment, and providing, based at least in part on the one or more streams of data, multi-gigabit Ethernet to the one or more user equipment utilizing an analog or digital modulation scheme over one or more channels. Wirelessly transmitting one or more streams of data from the collector terminal node area to one or more user equipment may include wirelessly transmitting the one or more streams utilizing one or more high gain directional antennas in the millimeter wave band. The millimeter wave band may include one or more V-band frequencies, one or more E-band frequencies, or frequencies between 200 GHz and 280 GHz. Providing, based at least in part on the one or more streams of data, multi-gigabit Ethernet to the one or more user equipment utilizing an analog or digital modulation scheme over one or more channels may include aggregating the one or more channels. The analog or digital modulation scheme may include a quadrature amplitude modulation (QAM) scheme.

Another example embodiment is a system including at least one processor, and at least one memory storing computer executable instructions that when executed by the processor, cause the network equipment to provide a multi-wavelength fiber link from a collector terminal node area to a central office, wirelessly transmit one or more streams of data from the collector terminal node area to one or more user equipment, and provide, based at least in part on the one or more streams of data, multi-gigabit Ethernet to the one or more user equipment utilizing an analog or digital modulation scheme over one or more channels. Wirelessly transmitting one or more streams of data from the collector terminal node area to one or more user equipment may include wirelessly transmitting the one or more streams utilizing one or more high gain directional antennas in the millimeter wave band. The millimeter wave band may include one or more V-band frequencies, one or more E-band frequencies, or frequencies between 200 GHz and 280 GHz. Providing, based at least in part on the one or more streams of data, multi-gigabit Ethernet to the one or more user equipment utilizing an analog or digital modulation scheme over one or more channels may include aggregating the one or more channels. The analog or digital modulation scheme may include a quadrature amplitude modulation (QAM) scheme.

Another example embodiment is a non-transitory computer readable storage device including instructions stored thereon, which when executed by one or more processor(s) of a network equipment, cause the network equipment to perform operations of providing a multi-wavelength fiber link from a collector terminal node area to a central office, causing to wirelessly transmit one or more streams of data from the collector terminal node area to one or more user equipment, and providing, based at least in part on the one or more streams of data, multi-gigabit Ethernet to the one or more user equipment utilizing an analog or digital modulation scheme over one or more channels. Wirelessly transmitting one or more streams of data from the collector terminal node area to one or more user equipment may include wirelessly transmitting the one or more streams utilizing one or more high gain directional antennas in the millimeter wave band. The millimeter wave band may include one or more V-band frequencies, one or more E-band frequencies, or frequencies between 200 GHz and 280 GHz. Providing, based at least in part on the one or more streams of data, multi-gigabit Ethernet to the one or more user equipment utilizing an analog or digital modulation scheme over one or more channels may include aggregating the one or more channels. The analog or digital modulation scheme may include a quadrature amplitude modulation (QAM) scheme.

The above description with reference to the accompanying drawings is provided to assist in a comprehensive understanding of certain embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments may be made without departing from the scope and spirit of the present disclosure. In addition, descriptions of well-known functions and constructions may be omitted for clarity and conciseness.

The terms used in the above description and following claims are not limited to their dictionary meanings, but, are merely used to enable a clear and consistent understanding of the present disclosure. Accordingly, it should be apparent to those skilled in the art that the following description of embodiments of the present disclosure is provided for illustration purpose only and not for the purpose of limiting the present disclosure as defined by the appended claims and their equivalents.

What is claimed is:

1. A method comprising:
providing a hybrid wireless network comprising at least a multi-wavelength fiber link from a collector terminal node area to a central office;
transmitting, using a high gain directional antenna, a first data stream using a first millimeter wave band comprising a frequency range of 70-90 GHz from the collector terminal node area to one or more user equipment situated in one or more geographic locations;
transmitting, using the high gain directional antenna, a second data stream using a second millimeter wave band comprising the frequency range;
establishing, using the first data stream, a first multi-gigabit Ethernet link to a first user equipment of the one or more user equipment; and
establishing, using the second data stream, a second multi-gigabit Ethernet link to a second user equipment of the one or more user equipment.

2. The method of claim 1, the method further comprising transmitting, using the high gain directional antenna, a third data stream using a third millimeter wave band comprising one or more V-band frequencies.

3. The method of claim 1, the method further comprising transmitting, using the high gain directional antenna, a third data stream using a third millimeter wave band comprising frequencies between 200 GHz and 280 GHz.

4. The method of claim 1, wherein establishing the first multi-gigabit Ethernet link to the first user equipment comprises utilizing an analog or digital modulation scheme over one or more channels and further comprises aggregating the one or more channels.

5. The method of claim 1, wherein establishing the first multi-gigabit Ethernet link comprises utilizing an analog or digital modulation scheme that comprises a quadrature amplitude modulation (QAM) scheme.

6. A network device connected, via a multi-wavelength fiber link, to a central office, the network device comprising:
a high gain directional antenna;
at least one processor, and
at least one memory storing computer executable instructions that when executed by the at least one processor, cause the network device to:
transmit, using the high gain directional antenna, a first data stream using a first millimeter wave band comprising a frequency range of 70-90 GHz to one or more user equipment situated in one or more geographic locations;
transmit, using the high gain directional antenna, a second data stream using a second millimeter wave band comprising the frequency range;
establish, using the first data stream one, a first multi-gigabit Ethernet link to a first user equipment of the one or more user equipment, and a second multi-gigabit Ethernet link to a second user equipment of the one or more user equipment; and establish, using the second data stream, a second multi-gigabit Ethernet link to a second user equipment of the one or more user equipment.

7. The network device of claim 6, wherein the instructions further cause the network device to transmit, using the high gain directional antenna, a third data stream using a third millimeter wave band comprising one or more V-band frequencies.

8. The network device of claim 6, wherein the instructions further cause the network device to transmit, using the high gain directional antenna, a third data stream using a third millimeter wave band comprising frequencies between 200 GHz and 280 GHz.

9. The network device of claim 6, wherein to establish the first multi-gigabit Ethernet link comprises using one or more channels including a plurality of aggregated channels.

10. The network device of claim 6, wherein to establish the first multi-gigabit Ethernet link comprises to utilize an analog or digital modulation scheme that comprises a quadrature amplitude modulation (QAM) scheme.

11. A non-transitory computer readable storage medium including instructions stored thereon, which when executed by one or more processor(s) of network equipment, cause the network equipment to perform operations of:
    receive data, by a multi-wavelength fiber link from a central office;
    causing to transmit, using a high gain directional antenna, a first data stream using a first millimeter wave band comprising a frequency range of 70-90 GHz to one or more user equipment situated in one or more geographic locations;
    causing to transmit, using the high gain directional antenna, a second data stream using a second millimeter wave band comprising the frequency range;
    establishing, using the first data stream, a first multi-gigabit Ethernet link to a first user equipment of the one or more user equipment; and
    establishing, using the second data stream, a second multi-gigabit Ethernet link to a second user equipment of the one or more user equipment.

12. The computer readable storage medium of claim 11, wherein the operations further comprise transmitting, using the high gain directional antenna, a third data stream using a third millimeter wave band comprising one or more V-band frequencies.

13. The computer readable storage medium of claim 11, wherein the operations further comprise transmitting, using the high gain directional antenna, a third data stream using a third the millimeter wave band comprising frequencies between 200 GHz and 280 GHz.

14. The computer readable storage medium of claim 11, wherein establishing the first multi-gigabit Ethernet link to the first user equipment comprises utilizing an analog or digital modulation scheme over one or more channels and further comprises aggregating the one or more channels.

15. The computer readable storage medium of claim 11, wherein establishing the first multi-gigabit Ethernet link comprises utilizing an analog or digital modulation scheme that comprises a quadrature amplitude modulation (QAM) scheme.

* * * * *